United States Patent

Gatzmanga

[11] Patent Number: 5,866,232
[45] Date of Patent: Feb. 2, 1999

[54] SEALING, TRIMMING AND FINISHING STRIPS

[75] Inventor: Eckard Gatzmanga, Krefeld, Germany

[73] Assignee: Draftex Industries Limited, Edinburgh, Scotland

[21] Appl. No.: 812,350

[22] Filed: Mar. 5, 1997

[30] Foreign Application Priority Data

Mar. 8, 1996 [GB] United Kingdom .................... 9604969
Sep. 3, 1996 [GB] United Kingdom .................... 9618356

[51] Int. Cl.[6] ................................ B60J 10/10; E06B 7/16
[52] U.S. Cl. ........................ 428/122; 49/490.1; 52/716.5; 428/358
[58] Field of Search ..................................... 428/122, 358; 49/490.1; 52/716.5

[56] References Cited

U.S. PATENT DOCUMENTS 4,656,086   4/1987   Bowers et al. ...................... 428/122 X
5,249,353  10/1993   Kranz ................................. 428/122 X
5,545,448   8/1996   Ford et al. ........................... 428/122 X

FOREIGN PATENT DOCUMENTS 0390568  10/1990   European Pat. Off. .

*Primary Examiner*—Henry F. Epstein
*Attorney, Agent, or Firm*—Leydig, Voit & Mayer, Ltd.

[57] ABSTRACT

A sealing, trimming or finishing strip for fitting to the flange around the edge of a door or similar opening in a motor vehicle body has a channel-shaped gripping portion supporting a tubular sealing portion on the outside of the door opening and onto which the door sealingly closes. On the inside of the door opening, a cosmetic lip integrally extends laterally from the gripping portion and is curved-over to form a concave surface for embracingly receiving and gripping the edge of a trim panel. A cloth or textile covering extends over the outside surface of the cosmetic lip, around its distal edge and over the whole of the concave surface of the lip to terminate at a point on the outside side wall of the gripping portion. Because the textile covering extends over the whole of the concave surface of the cosmetic lip, as well as over the outer or convex surface thereof, instead of only partially over the concave surface, any tendency for the cosmetic lip to straighten under the effect of enhanced temperature on the textile covering is substantially avoided.

12 Claims, 1 Drawing Sheet ns,232

SEALING, TRIMMING AND FINISHING STRIPS

BACKGROUND OF THE INVENTION

The invention relates to sealing, trimming and finishing strips. Sealing, trimming and finishing strips embodying the invention, and to be described in more detail below by way of example only, are for use in motor vehicle body constructions.

BRIEF SUMMARY OF THE INVENTION

According to the invention, there is provided a channel-shaped sealing, trimming and finishing strip for embracingly gripping a supporting edge, comprising a lip running longitudinally along an outside surface of the strip at a position spaced from the channel mouth and extending away from the channel in a sideways direction and curved over at least partially in a re-entrant manner to define a partially concave surface for embracingly receiving a longitudinal edge of a panel-like member, and a superimposed textile covering on a convex surface of the lip opposite to the concave surface, the textile covering extending over the distal edge of the lip and over a sufficient part of the concave surface of the lip to substantially prevent the covering from causing the lip to straighten under conditions of enhanced temperature.

According to the invention, there is further provided a sealing, trimming or finishing strip for fitting around a closable opening in a motor vehicle body, comprising a channel-shaped gripping portion for embracingly gripping a flange running around the opening and a cosmetic lip running longitudinally along the outside of the gripping part adjacent the base of the channel and extending sideways therefrom and curved in re-entrant manner to present a concave surface facing towards the mouth of the channel and a convex surface facing in the opposite direction, the concave surface being adapted for embracingly receiving the edge of a vehicle trim part, and a textile covering extending over the whole of the convex surface of the cosmetic lip and continuously around the distal edge thereof and over substantially the whole of the concave surface thereof.

BRIEF DESCRIPTION OF THE DRAWINGS

Sealing, trimming and finishing strips for use in motor vehicle body construction and embodying the invention will now be described, by way of example only, with reference to the accompanying diagrammatic drawings in which.

DESCRIPTION OF PREFERRED EMBODIMENTS

Figure 1:
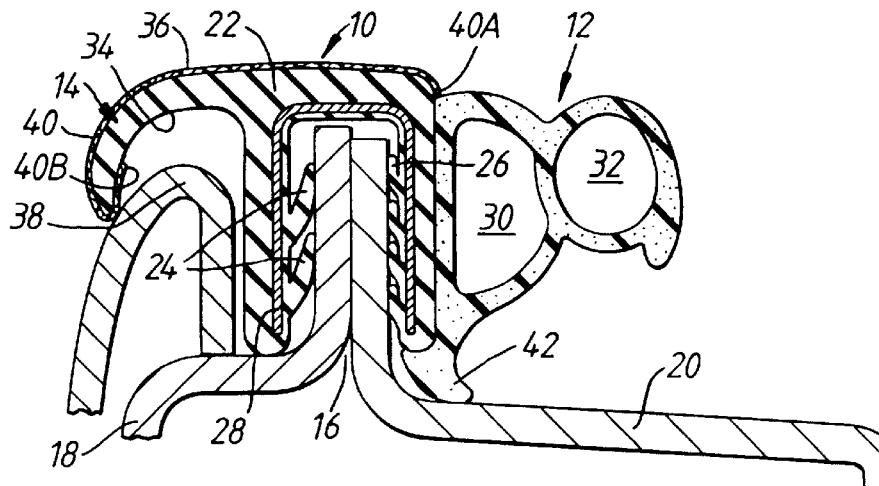
FIG. 1 shows a cross-section of a known form of sealing, trimming and finishing strip.

The strip shown in FIG. 1 is for sealing, trimming and finishing around an opening in a motor vehicle body, such as around a door opening. The strip comprises a channel-shaped gripping portion 10, a sealing portion 12, and a so-called "cosmetic lip" 14. The gripping portion 10 mounts the strip on the flange 16 which runs around the door opening and which is formed where the inner and outer body panels 18, 20 are welded together at the door opening. The gripping portion 10 comprises extruded plastics or rubber material 22 of generally channel-shape and extending longitudinally along all or part of the peripheral length of the door opening. The extruded material 22 is extruded to provide integral gripping lips 24 of relatively large size on one side of the inside channel wall and smaller gripping lips 26 on the opposite channel wall. The sizes and numbers of the gripping lips are shown purely by way of example.

The gripping portion 10 is reinforced by a channel-shaped metal core or carrier 28. The carrier 28 may be made of channel-shaped unapertured metal. Instead, it may be provided with slits or slots or other apertures to increase its flexibility. It may be formed of generally U-shaped elements joined together by integral connecting links or perhaps completely separated. Instead, the carrier may be of wire construction. Other forms of carrier are possible. The carrier 28 may be incorporated into the extruded material 22 by means of a known cross-head extruder.

The carrier 28 helps to reinforce the gripping portion 10 and to ensure that it is frictionally held on the flange in a firm manner. This process is assisted by the gripping lips 24, 26. The gripping lips are advantageously made of relatively soft material which increases their frictional gripping effect. The material of the lips 24, 26 may be softer than the remainder of the channel-shaped extruded material 22.

The sealing portion 12 is mounted on one outside side wall of the gripping portion 10 and comprises, in this example, two parallel and integrally connected tubular sections 30 and 32. The tubular sections 30, 32 may be made of soft sponge rubber. The sealing section 12 may be produced separately and secured to the gripping portion 10 as by means of adhesive. Instead, however, it may be co-extruded with the gripping portion 10.

The gripping portion 10 mounts the sealing portion 12 on the flange 16 so that the sealing portion runs along the outside of the periphery of the door opening and is partially compressed by the closing door, thus forming a weather-proof seal.

The cosmetic lip 14 comprises a lip extending longitudinally of the strip and formed integrally with the extruded material 22 of the gripping portion 10. However, the material of the cosmetic lip 14 may be relatively stiff. The cosmetic lip 14 has a curved-over extremity to produce a concave under surface 34 (as viewed in the Figure) and a convex upper surface 36. The purpose of the cosmetic lip is to receive and to grip an edge of the interior body trim 38. The cosmetic lip 14 hides the possibly unsightly edge of the trim 38 and secures the edge in position.

In order to improve the appearance of the sealing, trimming and finishing strip, it may be provided with a cloth or textile covering 40 as indicated in FIG. 1. This covering 40 extends from an edge 40A in contact or closely adjacent to the sealing portion 12 over the convex surface 36, and thence to an edge 40B on the inside facing surface 34 of the cosmetic lip 14, adjacent its free extremity. The cloth or textile coating 40 may be of appropriate colour to match the colour of the vehicle's interior body trim and to provide a pleasing appearance.

Figure 2:
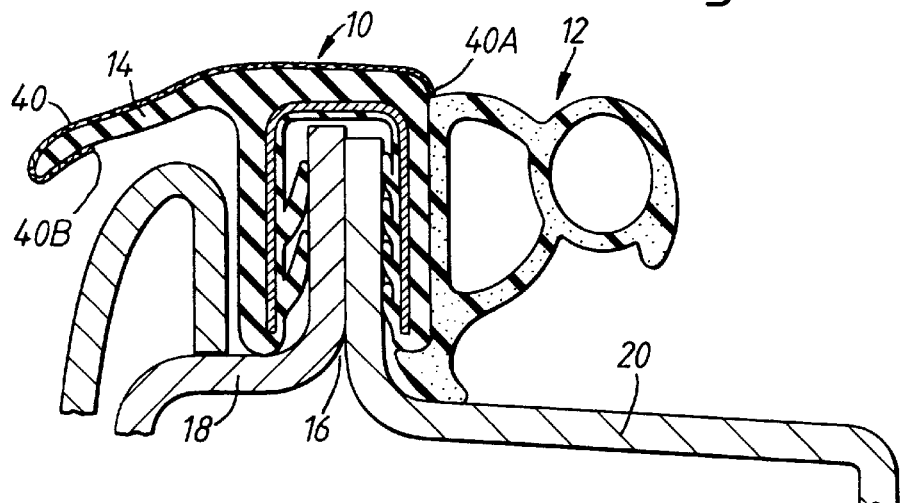
FIG. 2 shows the strip of FIG. 1 and illustrates the form which it may take under high temperature conditions.

However, in the known form shown in FIG. 1, it is found that, under enhanced temperature conditions, the textile covering 40 has a tendency to cause the cosmetic lip 14 to straighten, as shown in FIG. 2; FIG. 2 shows the shape which the cosmetic lip 14 of FIG. 1 may assume in high temperature conditions (e.g. 90° C.). This straightening of the cosmetic lip 14 is clearly unsatisfactory: the possibly unsightly edge of the trim panel 38 is no longer hidden or securely fastened and may therefore become visible and easily displaced.

Figure 3:
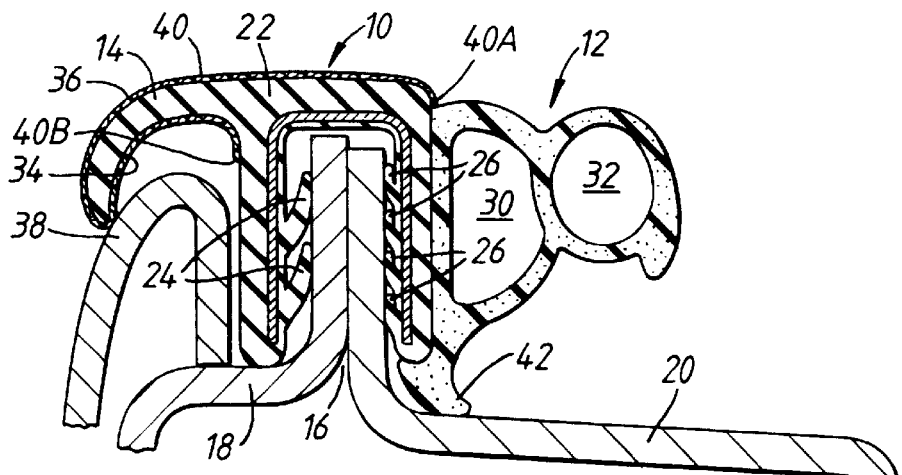
FIG. 3 shows a cross-section of one of the sealing, trimming and finishing strips embodying the invention.

FIG. 3 shows a sealing, trimming and finishing strip embodying the invention, and parts in FIG. 3 corresponding to those in FIGS. 1 and 2 are correspondingly referenced. In the strip of FIG. 3, it will be noted that the textile or cloth covering 40 is extended fully over the concave surface 34 of the lip 14; the terminating line 40B is positioned beyond the radius where the cosmetic lip meets the adjacent outside side wall of the channel of the gripping portion 10. Under conditions of high temperature, as high as the situation illustrated in FIG. 2, it is found that the cosmetic lip 14 of the strip of FIG. 3 does not have any tendency to straighten-out. It is found that any shrinkage tendency caused by the textile or cloth covering 40 on the outside surface 36 of the cosmetic lip 14 (which would tend to cause the cosmetic lip to straighten-out) is balanced by a similar shrinking tendency of the covering 40 on the inside concave surface 34 of the lip 14. The net result is that the cosmetic lip 14 does not tend to straighten-out. It is found that the tendency for the cosmetic lip 14 to straighten-out is substantially removed provided that the covering 40 extends over at least 50% of the inside concave surface 34 of the lip, though best results are achieved if the covering extends over substantially the whole of the concave surface.

The gripping effect, and the enhanced appearance, provided by the cosmetic lip 14 are thus preserved under conditions of high temperature.

The sealing portion 12 may be provided with a longitudinally extending lip 42 for providing an additional sealing action against the body panel 20.

What is claimed is:

1. A longitudinally extending channel-shaped sealing, trimming and finishing strip for embracingly gripping a support edge, comprising a strip body having a longitudinally extending base and two substantially parallel spaced-apart side walls on the base to define with the base a channel having a mouth substantially opposite the base, a lip running longitudinally along an outside surface of the strip body at a position spaced from the channel mouth and extending away from the channel in a sideways direction and curved over at least partially in a re-entrant manner to define a partially concave surface spaced from one of the side walls by a free space for embracingly receiving a longitudinal edge of panel-like member, the lip also defining a convex surface opposite to the concave surface, and a superimposed textile covering on the convex surface of the lip, the textile covering extending over the distal edge of the lip and over a sufficient part of the concave surface of the lip within the free space to substantially prevent the covering from causing the lip to straighten under conditions of enhanced temperature.

2. A strip according to claim 1, wherein the lip extends sideways from the base of the channel.

3. A strip according to claim 2, wherein said strip body includes an outside surface of the base disposed substantially opposite the mouth, and wherein the textile covering extends over at least part of the outside of the base of the channel and over the whole of the convex surface of the lip.

4. A strip according to claim 1, in which the textile covering extends over not less than 50% of the concave surface of the lip.

5. A strip according to claim 1, in which the textile covering extends over the whole of the concave surface of the lip.

6. A strip according to claim 5, in which the textile covering extends from the concave surface of the lip onto the outside surface of the channel.

7. A strip according to claim 1, further including a sealing part extending longitudinally along the outside of the strip body on the opposite wall thereof to said lip.

8. A strip according to claim 1, in which the channel is made of extruded plastics or rubber or other similar flexible material.

9. A strip according to claim 8, including an embedded reinforcing carrier within the extruded material.

10. A sealing, trimming or finishing strip for fitting around a closable opening in a motor vehicle body, comprising a longitudinally extending channel-shaped gripping portion having a base and side walls having an outside surface and an inside surface defining a channel for embracingly gripping a flange running around the opening, the channel having a mouth, a cosmetic lip running longitudinally along the outside surface of the gripping portion adjacent the base of the channel and extending sideways therefrom and having a distal edge and being curved in re-entrant manner towards the outside surface of one of the side walls to present a concave surface spaced from that side wall by a free space, the lip having a convex surface facing in the opposite direction to the concave surface, the concave surface of the lip being adapted for embracingly receiving the edge of a vehicle trim part in the free space, and a textile covering extending over the whole of the convex surface of the cosmetic lip and continuously around the distal edge thereof and over substantially the whole of the concave surface thereof.

11. A strip according to claim 10, in which the textile covering extends from the concave surface of the cosmetic lip onto the adjacent outside side wall of the gripping portion.

12. A strip according to claim 10, including a sealing part extending longitudinally along the outside of the channel on the opposite sidewall thereof to the said lip.

* * * * *